United States Patent
Koncz

(10) Patent No.: US 11,577,710 B2
(45) Date of Patent: Feb. 14, 2023

(54) OPERATIONALLY RELIABLE PARKING VALVE

(71) Applicant: KNORR-BREMSE Systeme fuer Nutzfahrzeuge GmbH, Munich (DE)

(72) Inventor: Laszlo Koncz, Kecskemet (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 17/251,430

(22) PCT Filed: Jun. 11, 2019

(86) PCT No.: PCT/EP2019/065163
§ 371 (c)(1),
(2) Date: Dec. 11, 2020

(87) PCT Pub. No.: WO2019/238651
PCT Pub. Date: Dec. 19, 2019

(65) Prior Publication Data
US 2021/0237707 A1   Aug. 5, 2021

(30) Foreign Application Priority Data
Jun. 13, 2018 (DE) .................... 10 2018 209 479.9

(51) Int. Cl.
*B60T 15/04* (2006.01)
*B60T 7/10* (2006.01)
(Continued)

(52) U.S. Cl.
CPC ............ *B60T 15/041* (2013.01); *B60T 7/101* (2013.01); *B60T 13/385* (2013.01);
(Continued)

(58) Field of Classification Search
CPC .......... B60T 7/08; B60T 7/101; B60T 13/261; B60T 13/585; B60T 15/041;
(Continued)

(56) References Cited

U.S. PATENT DOCUMENTS 3,667,723 A    6/1972  Schneider
3,685,870 A *  8/1972  Jensen .................... B60T 15/02
                                                       303/85

(Continued)

FOREIGN PATENT DOCUMENTS

AU    2797300 A    8/2000
CN    1794391 A    6/2006
(Continued)

OTHER PUBLICATIONS

Englished machined translation of EP 1512600 A1, (Mar. 9, 2005).*
(Continued)

*Primary Examiner* — Robert A. Siconolfi
*Assistant Examiner* — San M Aung
(74) *Attorney, Agent, or Firm* — Crowell & Moring LLP

(57) ABSTRACT

A parking valve for manually actuating a spring-loaded parking brake, includes: a housing with a port that can be fluidically connected to a release chamber of a spring-loaded brake cylinder, a port that can be fluidically connected to a brake supply reservoir, and a ventilation port; a slide for manual actuation and which can be moved along a full section between two end positions inside the housing. The slide assumes positions along the full section, in which, as a result of at least one seal, there is no fluidic connection between the port to the release chamber and the ventilation port, and assumes other positions along the full section, in which, as a result of the at least one seal, there is no fluidic connection between the port of the release chamber and the port to the brake supply reservoir. A blocking device acts on (Continued)

the slide during movement at least along a partial section of the full section in at least one direction, with a continuously variable counterforce dependent on the position of the slide on the partial section.

17 Claims, 7 Drawing Sheets

(51) Int. Cl.
    *B60T 13/38*     (2006.01)
    *B60T 15/18*     (2006.01)
    *B60T 13/26*     (2006.01)
    *F16K 21/10*     (2006.01)

(52) U.S. Cl.
    CPC ........... *B60T 15/182* (2013.01); *B60T 13/261* (2013.01); *F16K 21/10* (2013.01)

(58) Field of Classification Search
    CPC .... B60T 15/182; B60T 15/206; B60T 15/226; B60T 15/246; B60T 17/221; F16K 21/10; F16K 31/084
    USPC ......................................................... 188/167
    See application file for complete search history.

(56) References Cited

U.S. PATENT DOCUMENTS

| | | | |
|---|---|---|---|
| 4,307,917 A | | 12/1981 | Hasselbacher et al. |
| 6,378,668 B1 | * | 4/2002 | Zemyan ................ B61H 13/02 188/170 |
| 2003/0038533 A1 | * | 2/2003 | Bezzina ................ B60T 13/261 303/3 |
| 2010/0133080 A1 | | 6/2010 | Jeong et al. |
| 2013/0284574 A1 | | 10/2013 | Fangmann et al. |

FOREIGN PATENT DOCUMENTS

| | | | | |
|---|---|---|---|---|
| CN | 101752108 A | 6/2010 | | |
| CN | 102606779 A | 7/2012 | | |
| CN | 103377839 A | 10/2013 | | |
| DE | 19 62 069 C2 | 9/1982 | | |
| DE | 10 2007 053 767 B3 | 3/2009 | | |
| DE | 10 2009 007 689 A1 | 8/2010 | | |
| DE | 10 2011 053 529 A1 | 3/2013 | | |
| DE | 10 2016 008 215 A1 | 1/2018 | | |
| EP | 1 132 275 A2 | 9/2001 | | |
| EP | 1 386 810 A1 | 2/2004 | | |
| EP | 1 512 600 A1 | 3/2005 | | |
| EP | 2193965 A2 | * | 6/2010 | |
| EP | 2193965 A2 | * | 6/2010 | ............. B60T 13/24 |
| EP | 2 218 617 A2 | 8/2010 | | |
| EP | 2 058 187 B1 | 11/2011 | | |
| EP | 2426021 | * | 3/2012 | |
| EP | 2426021 A1 | * | 3/2012 | ............. B60T 13/265 |
| EP | 2489411 A1 | * | 8/2012 | ............. A62C 37/11 |
| EP | 2 567 874 B1 | 7/2015 | | |
| EP | 3 228 512 A1 | 10/2017 | | |
| EP | 2 218 617 B1 | 5/2019 | | |
| GB | 1017817 A | 1/1966 | | |
| WO | WO 2018/006991 A1 | 1/2018 | | |

OTHER PUBLICATIONS

English machined translation of EP-2489411 A1, Aug. 22, 2012.*
International Search Report (PCT/ISA/210) issued in PCT Application No. PCT/EP2019/065163 dated Oct. 11, 2019 with English translation (six (6) pages).
German-language Written Opinion (PCT/ISA/237) issued in PCT Application No. PCT/EP2019/065163 dated Oct. 11, 2019 (five (5) pages).
German-language Office Action issued in German Application No. 10 2018 209 479.9 dated Jun. 11, 2019 (six (6) pages).
Hindi-language Office Action issued in Indian Application No. 2020037052880 dated Jul. 13, 2021 with English translation (6 pages).
International Preliminary Report on Patentability (PCT/IB/326 & PCT/IB/373) issued in PCT Application No. EP2019/065163 dated Dec. 24, 2020, including English translation of document C2 (German-language Written Opinion (PCT/ISA/237) previously filed on Dec. 11, 2020) (seven(7) pages).
Chinese-language Office Action issued in Chinese Application No. 201980039445.1 dated Jul. 20, 2022 with English translation (17 pages).

* cited by examiner

OPERATIONALLY RELIABLE PARKING VALVE

BACKGROUND AND SUMMARY OF THE INVENTION

The invention relates to a parking valve for manual actuation of a spring-loaded parking brake of a trailer.

A parking valve of this kind makes it possible, in a "Park" position, to release compressed air from a release chamber of a brake cylinder of a spring-loaded parking brake in order to apply the brake by means of a spring-loaded piston. In the "Drive" position, the brake can then be released again by the parking valve in that the release chamber is refilled with compressed air from a pressure accumulator, as a result of which the piston is guided back into its original position, counter to the spring loading, thus releasing the brake.

Parking valves of this kind generally have a slide for manual actuation which establishes the corresponding connections to the release chamber within a housing of the parking valve by means of seals on the circumference of said slide. Here, it must be possible for the slide to be transferred reliably by an operator to the "Drive" and "Park" positions, which are, in particular, the end positions thereof, wherein indeterminate positions should be avoided. In this case, an indeterminate position is defined by a position of the slide in which it is not possible to make a clear distinction between the two positions and hence, for example, the release chamber can be vented while driving, which would result in application of the brake while driving.

In order to avoid these safety-critical indeterminate positions, there are known parking valves which, on a partial path of the overall path to be traversed, subject the slide to a counterforce in order to present an operator with a force threshold that they have to overcome. Once the operator has overcome the force threshold, the slide is transferred to the corresponding end position since the operator cannot reduce their actuating force quickly enough. Overcoming the force threshold thus ensures reliable operation of the parking valve.

Such a force threshold is generally achieved by means of a friction member which is in contact, with increased friction, with a corresponding mating surface on the corresponding partial path. However, this embodiment of the force threshold has the disadvantage that, to obtain a particular force characteristic on the slide during the movement, it is necessary to expend a relatively large amount of design effort in matching the friction member and the mating surface to one another. Moreover, both elements of the force threshold are exposed to the mutual contact of high sliding friction, which in turn leads to wearing of these elements. In extreme cases, the wear can change the counterforce on the slide, making it significantly lower if the friction member is severely worn or the mating surface is severely worn, thereby reducing operational reliability.

It is therefore the object of the present invention to make available a parking valve which is operationally reliable and can be transferred from one position to the other position without the abovementioned disadvantages.

This object is achieved by the subject matter according to the independent claim. Advantageous developments form the subject matter of the dependent claims.

According to the invention, a parking valve for manual actuation of a spring-loaded parking brake is provided, having:

- a housing with a port that can be fluidically connected to a release chamber of a spring-loaded brake cylinder, a port that can be fluidically connected to an air reservoir, and a vent port,
- a slide, which is designed for manual actuation and can be moved along an overall path between two end positions inside the housing, wherein the slide is designed to assume positions along the overall path in which, as a result of at least one seal, there is no fluidic connection between the port to the release chamber and the vent port, and to assume other positions along the overall path in which, as a result of the at least one seal, there is no fluidic connection between the port of the release chamber and the port to the air reservoir, and
- an inhibiting device, which, during movement at least along a partial path of the overall path, is designed to act on the slide in at least one direction with a variable counterforce dependent on the position of the slide on the partial path.

The slide is preferably provided in a sliding and/or sealing manner in the housing.

In this arrangement, the counterforce is preferably of continuously variable design. This should be taken to mean, in particular, that the counterforce changes during the movement along the partial path. As a particular preference, it is not constant over the movement.

Here, the end positions of the slide preferably have stops, which, as a particular preference, are formed within the housing and with which the slide can come into contact.

In the text which follows, a distinction is drawn as follows between the terms "partial path" and "path section". A partial path forms part of the overall path, on which a force from the inhibiting device counter to the direction of movement of the slide, i.e. a counterforce, acts on the slide when the slide is traversing said part. A path section, in turn, forms part of the overall path, on which a force from the inhibiting device in the direction of movement of the slide, i.e. an assisting force, or no force from the inhibiting device acts on the slide when the slide is traversing said part. Thus, the effect of the inhibiting device as the partial path is traversed is that of inhibiting further movement of the slide, while, as the path section is traversed, it is that of assisting or at least being neutral with respect to the further movement of the slide. Here, the partial path and the path section can consist of nonadjoining parts of the overall path.

The partial path preferably includes at least one end position of the slide. This ensures that the counterforce acts on the slide at least in one end position, with the result that an operator must overcome this force even during the movement out of the corresponding end position.

The counterforce is preferably not produced on the basis of mechanical friction between two components. In order to keep wear low or completely avoid it, production of the counterforce is provided in some way other than by means of mechanical friction. The counterforce is preferably produced by means of magnetic and/or pneumatic force.

The inhibiting device preferably has a latch, which is designed to hold the slide at least in one position or in a limited region of the overall path. The operational reliability of the parking valve is thus further enhanced since it is ensured that the slide cannot move out of the latched position, which is preferably at least one end position, due to vibrations or shocks during travel or due to random contacts of the slide. Here, the latch is either embodied separately, e.g. by means of elements that engage with one another frictionally and/or positively, or by means of a special configuration of the counterforce due to the inhibiting device. Thus, for example, the selected strength of the holding force of a magnet may be such that the magnet performs the function of a latch. It is likewise possible for a force on the slide produced by means of a vacuum or excess pressure to be sufficiently high to perform the function of a latch.

The at least one seal is preferably provided on the slide or in the housing. In this case, the at least one seal is designed to come into contact with a sealing surface to produce the sealing effect when the slide is moved along the overall path. Here, the sealing surface is preferably provided in the housing, and the at least one seal is provided on the slide. Alternatively or in addition, the sealing surface can be formed on the slide, and the at least one seal is provided in the housing.

The partial path preferably consists of at least two sections of the overall path which, in particular, do not adjoin one another directly. It is thus possible to ensure that an operator experiences a counterforce at several positions of the slide on the overall path. Between the sections of the partial path there is preferably a region in which the slide is subjected to no force or to an assisting force in the direction of the movement.

The counterforce on the slide preferably has a maximum value which is increased by at least 25%, preferably by at least 50%, relative to a force to which, owing to the design of the slide, in particular owing to the friction of the at least one seal in the housing, said slide is subject during a movement. This ensures that the counterforce on the slide can be distinguished clearly by the operator from a force which is fundamentally present during the movement of the slide. It is thus possible for an operator to feel when or from what position on the overall path they have overcome the force threshold that is characterized at least by the maximum value of the counterforce.

The inhibiting device is preferably designed to subject the slide, over a path section of the overall path which does not form part of the partial path, to an assisting force, dependent in particular on the position of the slide on the path section, in the direction of the movement, or to no force. It is thus advantageously possible, when an assisting force is acting on the slide, to assist the movement of the slide into the end position that lies in the direction of the movement, increasing the probability that the slide will also reach the corresponding end position.

The assisting force is preferably designed to bring about a movement of the slide into the end position which is in the direction of the movement, even without manual actuation. By virtue of this configuration of the assisting force, the slide is moved further by the assisting force, until the end position is reached, even if the actuating force of an operator on the slide disappears, e.g. because the operator has released it under the mistaken assumption that it has already reached the desired end position. The position and extent of the path section on which the assisting force acts on the slide is preferably chosen so that the slide no longer has to pass through an indeterminate position over any of its further movement travel.

The partial path on which the counterforce acts on the slide is preferably chosen in its position on the overall path and in its extent in such a way that it subjects the slide to a counterforce until the corresponding seal has reached the center of the port which can be connected to the release chamber. It is preferably adjoined by the path section on which the assisting force acts on the slide. This ensures that the counterforce and the assisting force always urge the slide away from possible indeterminate positions.

The inhibiting device is preferably designed to ensure that the counterforce and/or the assisting force are/is formed from the minimum to the maximum value thereof over a path whose length is, in particular, at least 2% of the overall path, preferably at least 5%, particularly preferably at least 8% of the overall path. A rise in the forces which is abrupt to the sensation of the operator is thus avoided, and therefore the operator cannot mistakenly infer the attainment of an end position from a suddenly occurring counterforce, for example. The risk of incorrect operation is thereby further reduced.

The inhibiting device is preferably designed to exert the counterforce and/or the assisting force on the slide by means of magnetic force, wherein the inhibiting device has, in particular, a magnet and a counterpart, e.g. a counterpart made of steel, which is designed to be attracted by the magnet, wherein the counterpart is, in particular, a second magnet or a magnetic element. Such a design of the inhibiting device has the effect of producing the counterforce and/or the assisting force without contact, making it possible to achieve a concept with a long life. Here, the counterforce will have to be overcome by an operator during the movement of the slide out of the end position in which the magnet and the counterpart are at a minimum distance from one another. In contrast, the slide is subject to the assisting force during the movement of the slide in the direction of the corresponding end position in which the magnet and the counterpart are at a minimum distance from one another, wherein the assisting force is caused by the magnetic force of attraction.

The magnet is preferably provided on or in the slide and the counterpart is provided on or in the housing, or the magnet is provided on or in the housing and the counterpart is provided on or in the slide.

The magnet and the counterpart are preferably arranged in such a way that the force of attraction thereof becomes a maximum in one end position of the slide, at least relative to all other possible positions of the slide.

The inhibiting device preferably has a further magnet or a further counterpart on or in the housing or on or in the slide. This further magnet or this further counterpart is preferably positioned in such a way that the magnetic force of attraction likewise becomes a maximum in the other end position of the slide.

It is, for example, possible to conceive of embodiments in which magnetic forces of attraction that pull the slide both into one end position and into the other end position act on the slide. These change with the position of the slide on the overall path and become smaller with the respective distance from the corresponding end position. On the overall path there is at least one slide position in which both forces of attraction balance each other out. Before this position was reached, the slide was still being acted upon, in the sum total of the forces of attraction, by the force of attraction counter to its direction of movement. After moving beyond this position, the slide is then subject in sum to an assisting force resulting from the magnetic force of attraction of the other end position, which is now growing stronger.

More specifically, the following preferred designs of an inhibiting device that causes magnetic forces in at least two positions, in particular the end positions, of the slide are conceivable:

One counterpart is connected in a fixed manner to the housing, and two magnets are connected firmly to the slide in a corresponding manner at two positions.

One magnet is connected in a fixed manner to the housing, and two counterparts are connected firmly to the slide in a corresponding manner at two positions.

Two counterparts are connected in a fixed manner to the housing at two positions, and one magnet is connected firmly to the slide in a corresponding manner.

Two magnets are connected in a fixed manner to the housing at two positions, and one counterpart is connected firmly to the slide in a corresponding manner.

Alternatively or in addition to the production of the force by means of magnetism, the production of the force on the slide by the inhibiting device in other ways is possible in another embodiment of the invention.

Here, the inhibiting device is preferably designed to subject the slide to a counterforce and/or an assisting force which is formed by a vacuum and/or an excess pressure. The slide and/or the housing are/is preferably designed as part of the inhibiting device to produce corresponding pressures.

The inhibiting device preferably has a chamber which is designed to be fluidically closed by the slide, at least when the slide is moved over the partial path, wherein the chamber is designed to change its volume in accordance with the movement of the slide. Here, the chamber is preferably formed in a part of the housing of the parking valve.

Alternatively or in addition, the chamber is formed at least partially in the slide. If the chamber is formed at least partially in the slide, one part of the housing is preferably designed to fluidically close the chamber over the partial path, preferably by the formation of a projection in the housing.

The closure of the chamber is preferably accomplished by means of a seal of the slide and/or of the housing and/or by means of separate elements designed for this purpose. Thus, the chamber can advantageously be closed on one side by means of one end of the slide, minimizing the design complexity. Here, the seal of the slide and/or the housing preferably comes into contact with a sealing surface, which is preferably provided in the housing and/or on the slide.

The seal, which is designed to close the chamber, can be identical with or formed separately from at least one seal designed to produce the fluidic connections of the individual port.

The chamber is preferably designed to be connected to atmosphere or to a venting device, in particular an equalization chamber, when the slide is moved beyond the partial path and/or the path section. For this purpose, equalization channels are preferably provided within the housing and/or on the slide, said channels allowing pressure equalization in certain slide positions by connecting the chamber to the atmosphere or to a venting device.

In particular, the equalization channels are embodied as grooves and/or bores. By means of appropriate positioning of the equalization channels on the overall path and the corresponding choice of the extent thereof over the overall path, a person skilled in the art can bring about a desired force characteristic on the slide.

The chamber is preferably designed to undergo a change in volume of at least 5%, preferably at least 10%, when the slide is moved over the partial path. This ensures that a force on the slide consisting of a vacuum or excess pressure can also be felt by an operator.

The embodiments described here can be combined in any desired manner, thereby enabling additional embodiments to be achieved. For example, it is possible to conceive of embodiments which have a slide that is acted upon both by magnetic and by pneumatic forces produced in accordance with the embodiments described above.

The invention is explained in greater detail below by means of the attached figures.

DETAILED DESCRIPTION OF THE DRAWINGS

Figure 1:
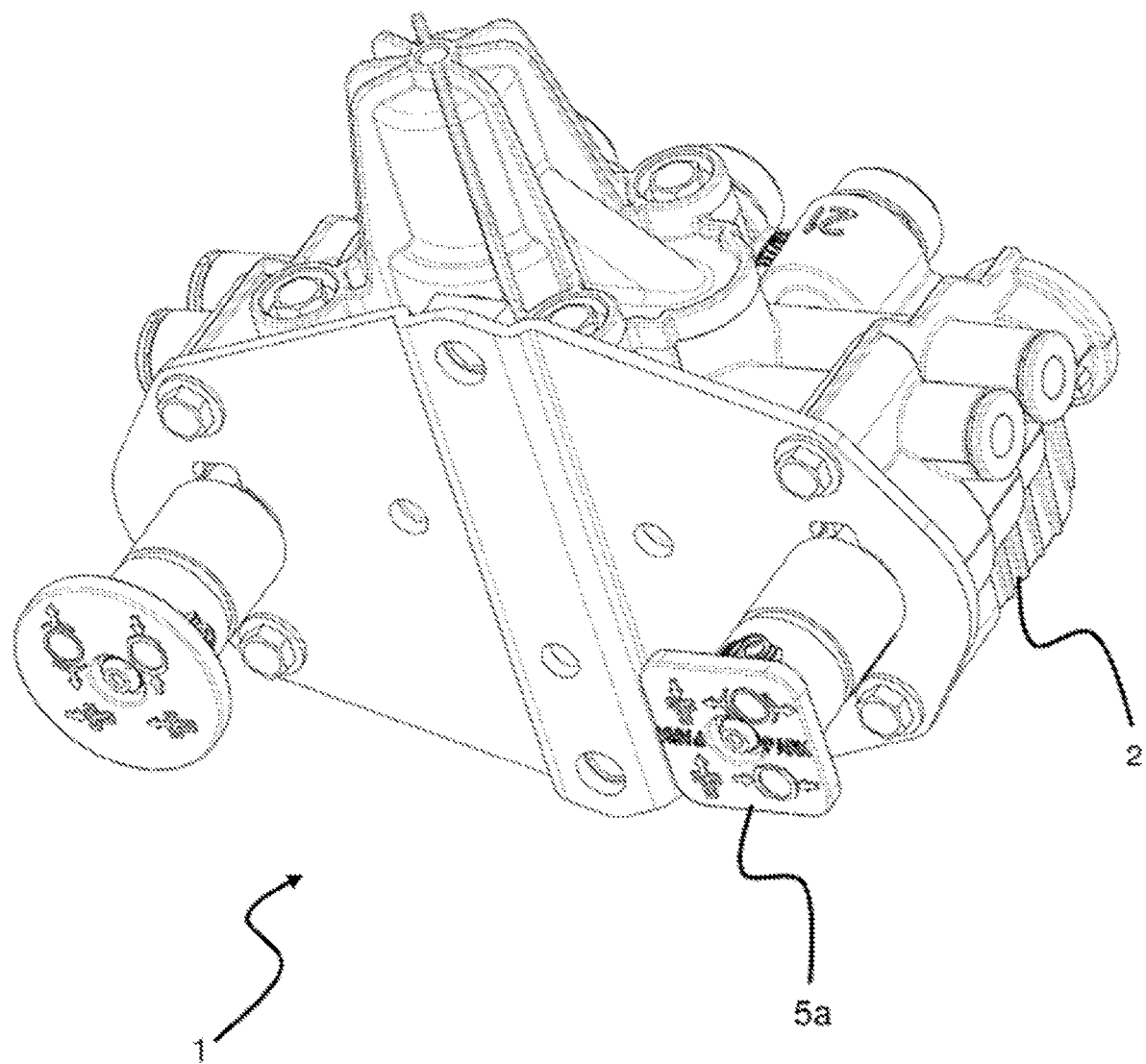
FIG. 1 shows an external view of a parking valve according to an embodiment of the invention.

FIG. 1 shows an external view of a parking valve 1 having a housing 2 and a slide knob 5a, which is in the "Drive" position. In the interior of the housing 2, the slide knob 5a is adjoined by a slide 5, which can be actuated manually by the slide knob 5a.

FIGS. 2a to 2d illustrate the principle of operation of the parking valve 1 by means of various positions of the slide 5 on the overall path 14.

Figure 2A:
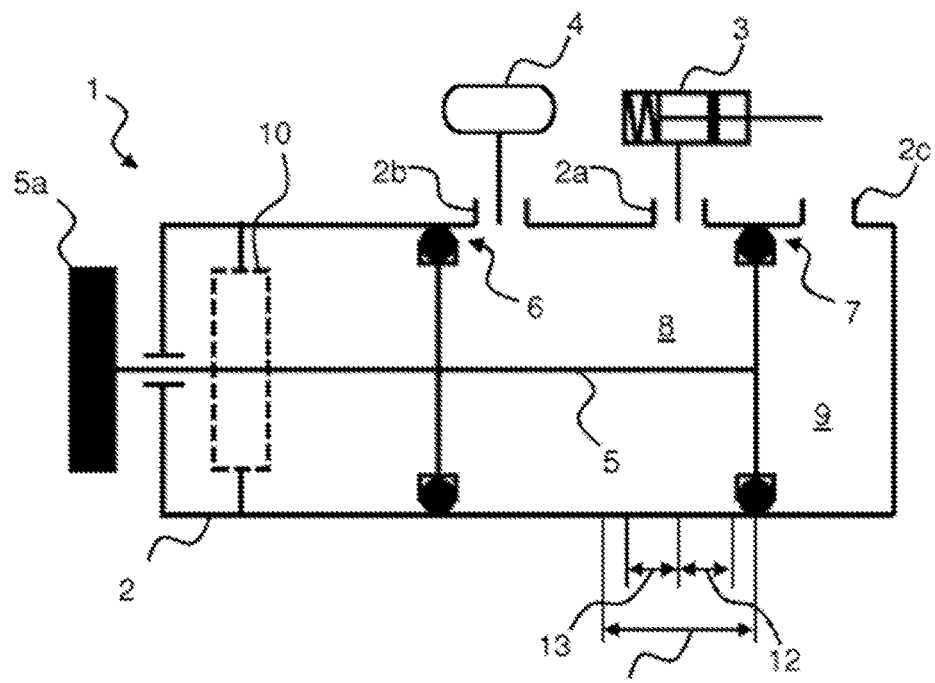
FIGS. 2a-d show schematic illustrations that illustrate the principle of operation of the operationally reliable parking valve by means of various positions of the slide.

The fundamental construction of the parking valve 1 is shown in FIG. 2a. The parking valve 1 has a housing 2 with a port 2a, which is connected to the release chamber of a spring-loaded brake cylinder 3. Also provided on the housing 2 are a port 2b, which is connected to an air reservoir 4, and a vent port 2c, which is in communication with the atmosphere or a venting device.

Here, the spring-loaded brake cylinder 3 is designed in such a way that it releases a brake when the release chamber thereof is supplied with sufficient compressed air, and applies said brake when the compressed air is released from the release chamber. Here, the application of the brake is normally accomplished by means of a force of a spring, which moves a corresponding piston within the spring-loaded brake cylinder 3. In the released position, the spring force is overcome by the pressure in the release chamber.

Figure 2B:
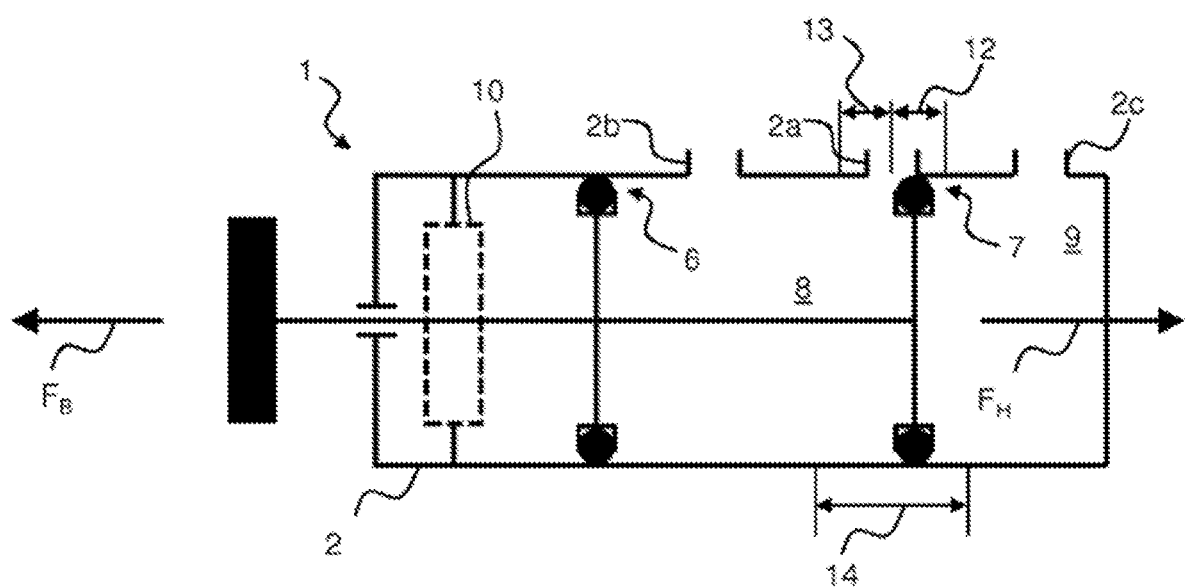
Figure 2C:
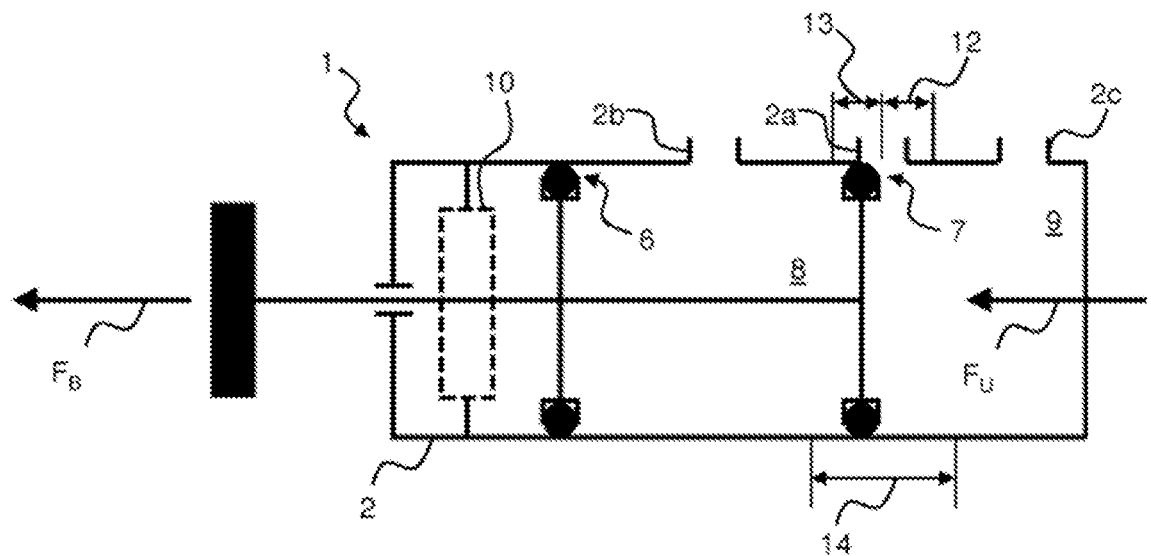
Figure 2D:
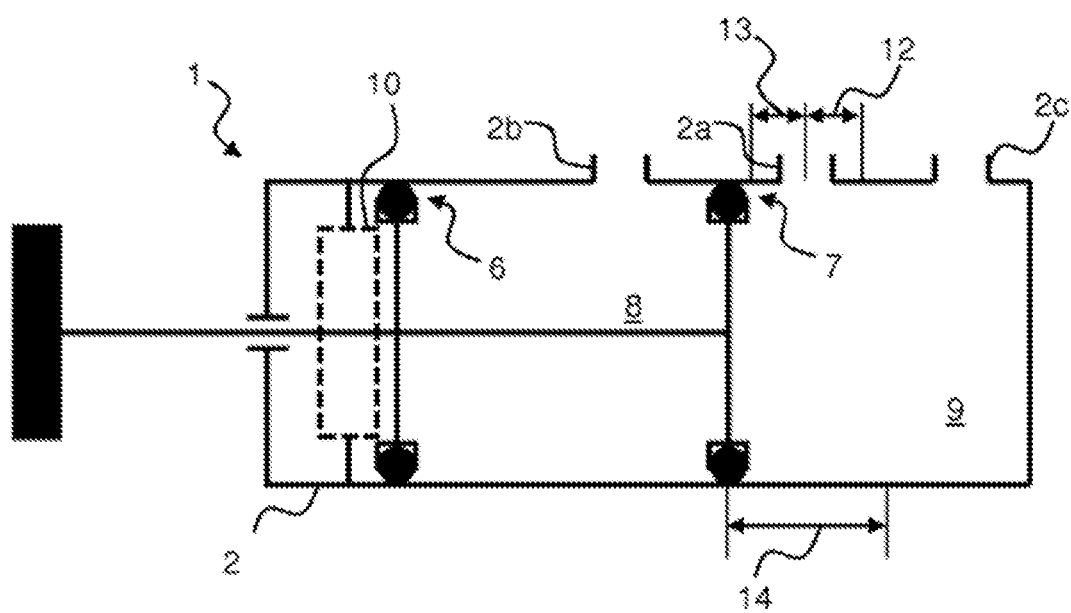

This configuration likewise applies in FIGS. 2b to 2d but, for reasons of clarity, the spring-loaded brake cylinder 3 and the air reservoir 4 are no longer illustrated.

Furthermore, the parking valve 1 has a slide 5, which carries seals 6, 7 on the circumference thereof. With the housing 2, these seals 6, 7 form an air admission chamber 8 and a venting chamber 9. In the position shown, the air admission chamber 8 is in communication with the ports 2a, 2b, while the venting chamber 9 is in communication with the vent port 2c.

The slide 5 itself can be moved to the left along its axis over an overall path 14, wherein it is designed for manual actuation. For this purpose, the left-hand end of the slide 5, which projects from the housing 2, has the slide knob 5a.

Furthermore, an inhibiting device 10 is shown as an area in dashed lines and, during movement at least along a partial path 12 of the overall path 14, is designed to act on the slide 5 in at least one direction with a variable counterforce $F_H$ dependent on the position of the slide 5 on the partial path 12 (see FIG. 2b).

In addition, the inhibiting device 10 is designed to subject the slide 5 to an assisting force $F_U$ as it traverses a path section 13 (see FIG. 2c).

Purely by way of example, the inhibiting device 10 shown is arranged at the point between the slide knob 5a and seal 6. However, it can also be arranged at any other points in order to subject the slide 5 to the counterforce $F_H$. Here, furthermore, the inhibiting device 10 is illustrated as connected firmly to the housing 2. This is likewise not absolutely essential for the design of the inhibiting device 10. Particularly the action of the inhibiting device 10 on the slide 5 can also be derived from the interaction of individual elements forming the inhibiting device 10, as is shown in FIGS. 3 to 6.

The construction described also corresponds to the construction shown in FIGS. 2b to 2d. Thus, the operation of the parking valve 1 will be explored below:

In FIG. 2a, the slide 5 is in the "Drive" position, which is defined by a stop (not shown) in the housing, for example, in which it is pressed into the housing 2. In this position, there is a fluidic connection between the air reservoir 4 and the release chamber of the spring-loaded brake cylinder 3 via port 2b, the air admission chamber 8 and port 2a. Here, the air admission chamber 8 is sealed off with respect to the venting chamber 9 and the rest of the housing 2 by the seals 6 and 7. It is thus possible to build up in the release chamber of the spring-loaded brake cylinder 3 a pressure which counteracts the spring of the spring-loaded brake cylinder 3 and thus releases the brake and holds it in the released state.

If the parking valve 1 is then to be transferred to the "Park" state, the slide 5 must then traverse the overall path 14, starting from the position shown in FIG. 2a, being transferred to the position shown in FIG. 2d. In this way, port 2a is connected to the atmosphere via the venting chamber 9, for example, as a result of which the pressure in the release chamber is dissipated and the brake is applied by the spring-loaded brake cylinder 3. During this process, it is to be ensured that the slide is transferred reliably from the "Drive" position to the "Park" position and vice versa without the slide 5 coming to rest in an indeterminate position within the housing 2.

In this context, an indeterminate position is defined as a position of the slide 5 in which there is no clear separation between the individual ports 2a, 2b, 2c by the slide 5, in particular by the seals 6, 7 on said slide. This is the case, for example, when seal 7 is over port 2a in such a way that both a flow of compressed air out of the air admission chamber 8 into port 2a and into the venting chamber 9 and thus into the atmosphere via the vent port 2c are possible. In this position, the parking valve 1 is in an undefined state.

In order to avoid such indeterminate positions, the inhibiting device 10 is provided, the operation of which is explained below:

A first position of the slide 5 as it traverses the overall path 14 within the housing 2 is shown in FIG. 2b. There, an actuating force $F_B$ to the left is exerted on the slide knob 5a by an operator, for example, said force moving the slide 5 along the overall path 14. Counteracting it along a partial path 12 of the overall path 14 is a counterforce $F_H$, which is caused by the inhibiting device 10. In the embodiment shown, the partial path 12 is arranged in such a way as to ensure that the slide 5 is subject to the counterforce $F_H$ up to half the width of port 2a. This ensures that, when there is a sudden collapse or complete failure of the actuating force $F_B$, e.g. because the operator has released the slide knob 5a, the slide 5 is moved back to the right into the "Drive" position by the counterforce $F_H$. In this case, the extent of the partial path 12 is chosen purely by way of example. In designing specific embodiments, a greater or lesser extent or different positions of the partial path 12 on the overall path 14 may also appear worthwhile to a person skilled in the art.

In the depicted position of the slide 5, seal 7 has reached the right-hand edge of port 2a. In the case of further movement to the left beyond this point, it loses its sealing effect with respect to the venting chamber 9. The air flowing out of the release chamber of the spring-loaded brake cylinder 3 can thus flow into the venting chamber 9 and onward through the vent port 2c out of the parking valve 1.

The consequence is a declining pressure in the spring-loaded brake cylinder 3, as a result of which the spring force in the spring-loaded brake cylinder 3 exceeds the pressure force in the release chamber, thereby applying the brake. However, the slide 5 is not in a defined end state in this position since air can flow out of the air admission chamber 8 both into the release chamber of the spring-loaded brake cylinder 3 and into the venting chamber 9 through port 2a.

As shown in FIG. 2c, the slide 5 must therefore be moved further at least over a path section 13, which, in addition to the partial path 12, is a further part of the overall path 14. For this purpose, the actuating force $F_B$ continues to be exerted on the slide knob 5a by the operator.

In this illustrative embodiment, the inhibiting device 10 is designed to impress upon the slide 5, over path section 13, an assisting force $F_U$ which acts on the slide 5 in the same direction as the actuating force $F_B$.

As a result, the movement of the slide 5 to the left is assisted by an additional force, increasing the probability that seal 7 will reach or travel over at least the left-hand edge of port 2a, thereby ensuring that the parking valve 1 is once again in a defined state. Since the air admission chamber 8 is once again completely sealed off from the venting chamber 9 by seal 7.

Thus, only the release chamber of the spring-loaded brake cylinder 3 is then still in communication with the atmosphere via the venting chamber 9. The release chamber can continue to vent, whereas the air admission chamber 8 and, in particular, the air reservoir 4 can no longer continue to vent to the atmosphere.

The extent of the path section 13 is chosen merely by way of example. In designing specific embodiments, a greater or lesser extent or different positions of the path section 13 on the overall path 14 may also appear worthwhile to a person skilled in the art.

Moreover, the application of an assisting force $F_U$ to the slide 5 by the inhibiting device 10 is not absolutely necessary. It is merely an advantageous development of the invention. Instead of the assisting force $F_U$, it is also possible for no force to be exerted on the slide 5 by the inhibiting device 10.

In the further course of actuation by the operator, the slide 5 is transferred to the end position of the overall path 14, which is defined by a stop (not shown) in the housing 2. This position of the slide 5 is depicted in FIG. 2d. The air admission chamber 8 is separated from the atmosphere and from the port 2a to the release chamber of the spring-loaded brake cylinder 3. The release chamber of the spring-loaded brake cylinder 3 vents to the atmosphere via the venting chamber 9.

In order to release the brake again, the slide 5 must be pushed back into the housing 2 along the overall path 14, starting from the position in FIG. 2d, and transferred into the position in FIG. 2a. In this embodiment, the inhibiting device 10 is designed then to exert a counterforce to the left on the slide 5, at least as it traverses the path section 13, and then to exert an assisting force to the right on the slide 5 as it traverses the partial path 12. As the partial path 12 and the path section 13 are traversed in the opposite direction, the force effects on the slide 5 are then reversed. It is then subjected to a force counter to its direction of movement on the path section 13 and to an assisting force on the partial path 12.

FIGS. 3 to 6 illustrate two different embodiments in respect of the design of the inhibiting device 10. It should be noted at this point that ports 2a to 2c and other design details of the parking valve 1 are not depicted in these figures since the intention is to explore only the design of the inhibiting device 10. In contrast to FIGS. 2a to 2d, the transfer from the "Park" position to the "Drive" position is shown here.

Figure 3:
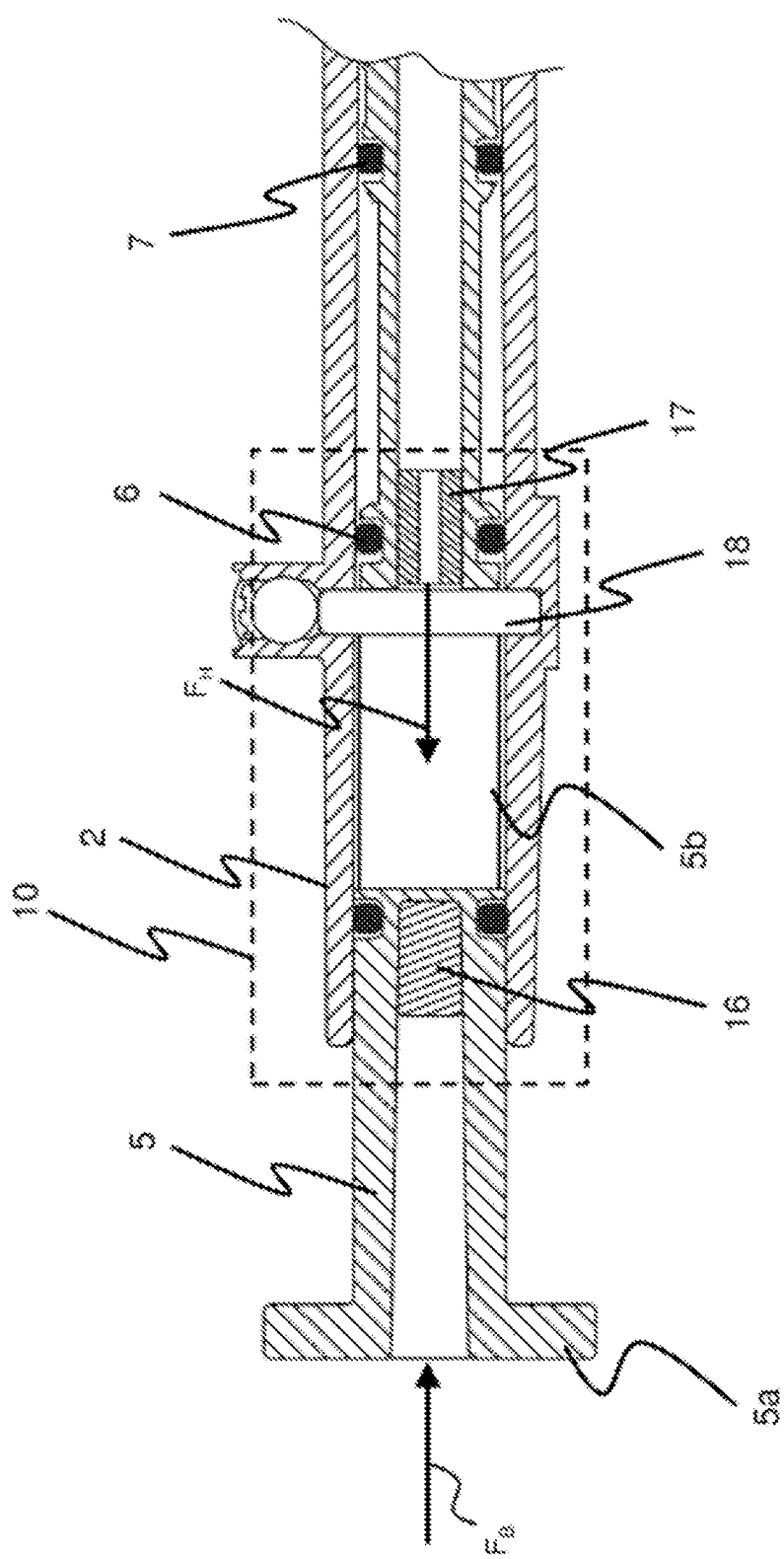
FIG. 3 shows a sectional view of a first embodiment of the invention, wherein the slide is in the "Park" position.

FIG. 3 shows a sectional view of a first embodiment of the inhibiting device 10. Here, the slide 5 is in the "Park" position. The inhibiting device 10 is distinguished by means of a box in dashed lines. In this case, it has two magnets 16, 17, which are provided within the slide 5 in this embodiment. Between the magnets 16, 17, the slide 5 has a recess 5b in the form of an elongate hole, in which there is a counterpart 18 in the form of a pin that is provided in a fixed manner in the housing 2. The recess 5b enables the slide 5 to be moved past the fixed counterpart 18 without this hindering the movement.

The mode of action of the inhibiting device 10 is based on the force of attraction between the magnets 16, 17 and the counterpart 18 to produce the counterforce $F_H$ and the assisting force $F_U$. Here, the counterpart 18 is made from a ferromagnetic material, for example, to enable it to be attracted by the magnets 16, 17.

In the depicted position of the slide 5 in FIG. 3, the distance between magnet 17 and the counterpart 18 is minimal. Since the slide 5 is in the "Park" position, it is fully extended from the housing 2.

If the slide 5 is then to be transferred to the "Drive" position, it must be pushed to the right into the housing 2 by an operator by the application of an actuating force $F_B$. During this process, the operator must first of all overcome the magnetic force of attraction between magnet 17 and the counterpart 18. The further magnet 17 and counterpart 18 move apart after this, the weaker the magnetic force of attraction between them becomes.

During this movement, the distance between magnet 16 and the counterpart 18 simultaneously becomes smaller, this having the effect that the force of attraction between these two elements rises.

In the course of the movement of the slide 5, a slide position is thus reached at which the forces of attraction of magnets 16 and 17 on the counterpart 18 have balanced out. Thus, no counterforce $F_H$ is exerted on the slide 5. If the movement is then continued, the force of attraction of magnet 16 on the counterpart 18 is predominant as the movement into the "Drive" position continues. However, this has an assisting effect in the direction of movement of the slide 5 to the right, as shown in FIG. 4, with the result that in addition to an actuating force $F_B$ exerted by an operator on the slide knob 5a, the slide 5 is subject to an assisting force $F_U$, which promotes transfer to the "Drive" position.

Figure 4:
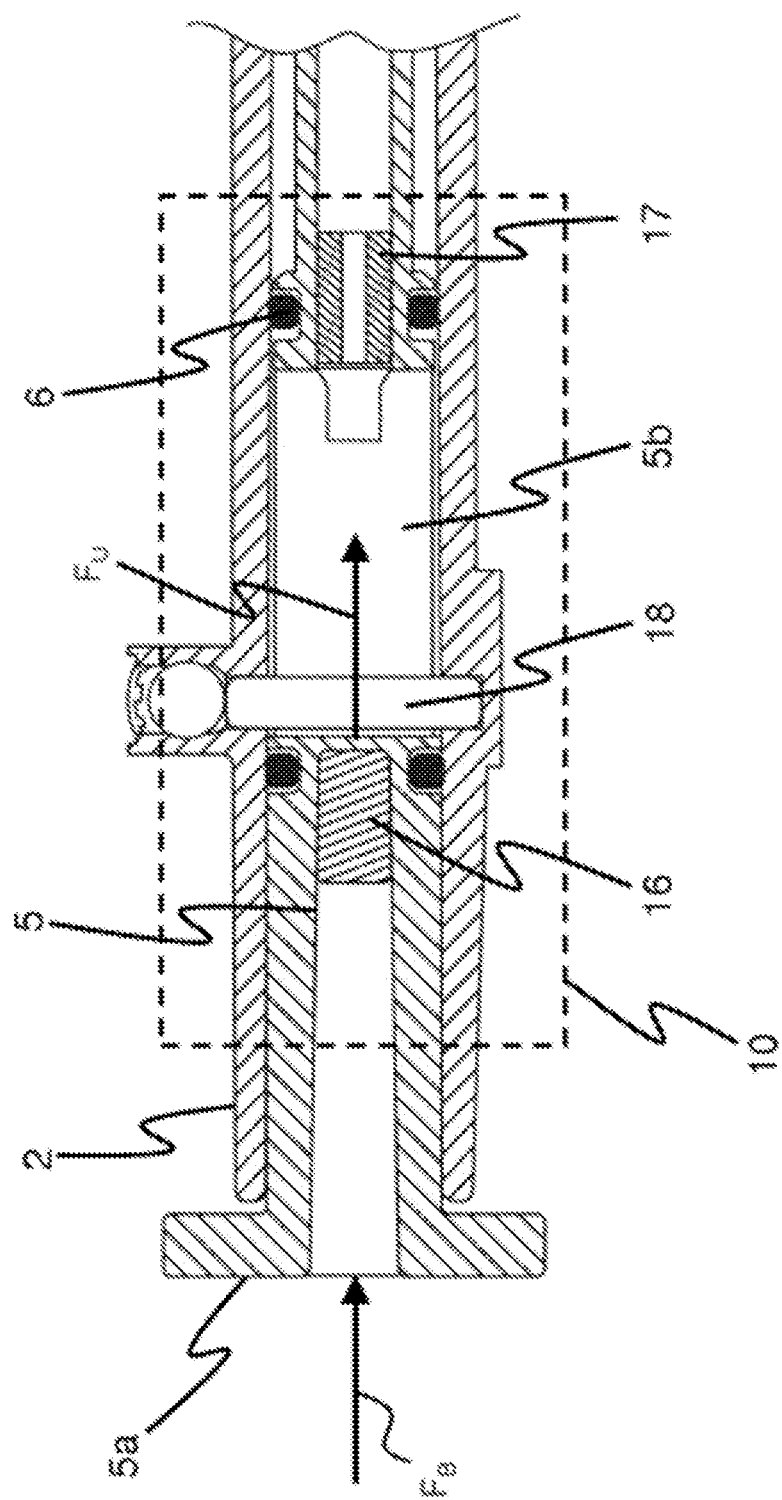
FIG. 4 shows a sectional view of the first embodiment of the invention, wherein the slide is in the "Drive" position.

This position is shown in FIG. 4. In this position, the distance between magnet 16 and the counterpart 18 is minimal, with the result that the magnetic force of attraction between the two elements becomes a maximum.

If the slide 5 is then to be transferred back to the "Park" position, magnet 16 then produces a counterforce on the slide 5, and magnet 17 exerts an assisting effect by virtue of its force of attraction.

The depicted embodiment of the inhibiting device 10 thus exerts a maximum counterforce $F_H$ on the slide 5 in both of the end positions shown when the slide 5 is to be transferred to the respective other position. This counterforce $F_H$, which forms a force threshold, must first of all be overcome by an operator, leading to the operator imparting movement to the slide 5 by means of a relatively high actuating force $F_B$. As soon as this counterforce $F_H$ has been overcome, the counterforce $F_H$ declines quickly over the traveled path of the slide 5 owing to the magnetic inverse square law. However, the operator cannot reduce the actuating force $F_B$ they are applying quickly enough, and therefore they push the slide 5 in the direction of the respective other end position with a relatively high actuating force $F_B$. Finally, the slide 5 reaches positions in which the force of attraction of the second magnet acts as part of the total forces of the inhibiting element 10 in addition to the actuating force $F_B$, as a result of which the slide 5 is subject to an assisting force $F_U$ in the direction of the second end position. The counterforce $F_H$ and the assisting force $F_U$ are thus forces resulting from the sum of the two forces of attraction of the magnets 16, 17 and the counterpart 18.

More specifically, the strength of the magnetic force of attraction chosen is such that, from a particular position of the slide 5, said slide is pulled into the closer end position even if the actuating force $F_B$ disappears.

Thus, the inhibiting device 10 can be designed in such a way that it enhances the operational reliability of the parking valve 1, in particular of the slide 5, wherein the inhibiting device 10 subjects the slide 5 to forces such that it is transferred reliably to the end positions. Here, a person skilled in the art can match the strength of the magnets 16, 17 to the specific use.

Moreover, a latch can simultaneously be formed in the end positions by the high magnetic force of attraction between one of the magnets 16, 17 and the counterpart 18 inasmuch as the magnetic force of attraction chosen is of a level such that the slide 5 remains in its current position, even in the event of shocks during driving or light touches which do not amount to an actuation.

Figure 5:
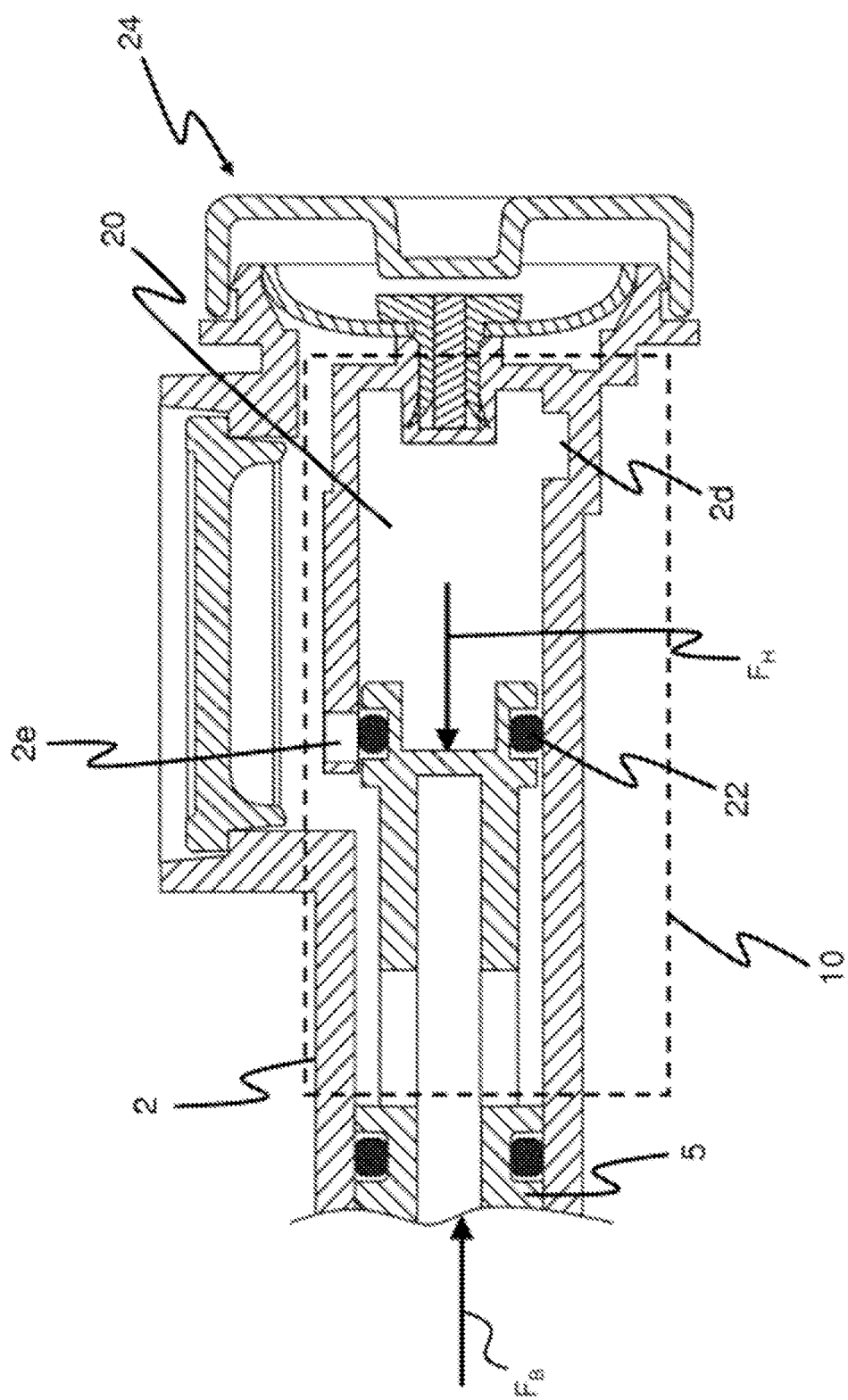
FIG. 5 shows a sectional view of a second embodiment of the invention, wherein the slide is in the "Park" position.

FIG. 5 shows a sectional view of another embodiment of the invention. It shows the end of the slide 5 which does not project from the housing 2. Here, the slide 5 is in the "Park" position. It is thus extended to the maximum extent from the housing 2. Here, the inhibiting device 10 is bordered by dashed lines and is formed by parts of the slide 5 and the housing 2, as explained below.

Formed in the housing 2 on the right of the slide 5 is a chamber 20, which can be closed in a sealing manner on the left-hand side by the slide 5 and, in particular, by a seal 22 on the slide 5. The chamber 20 has an equalization channel 2d, e.g. in the form of a groove or of a blind hole. Also shown is an equalization channel 2e, which connects the chamber 20 to a venting device 24. Here, the venting device 24 has a connection to the atmosphere or is designed as an equalization chamber.

In order then to transfer the slide 5 to the "Drive" position, it must be moved to the right in the housing 2 by means of the actuating force $F_B$. During this process, the seal 22 travels over equalization channel 2e, thereby closing the chamber 20 in a sealing manner. As the movement of the slide 5 progresses, the air enclosed therein must be compressed, giving rise in the chamber 20 to an excess pressure which brings about a counterforce $F_H$ on the slide 5, which increases as the movement of the slide 5 to the right progresses.

Once the seal 22 reaches equalization channel 2d, the compressed air in the chamber 20 can escape via equalization channel 2d to the venting device 24, as a result of which the excess pressure in chamber 20 is balanced out and the counterforce disappears. The slide 5 is in the "Drive" position.

Figure 6:
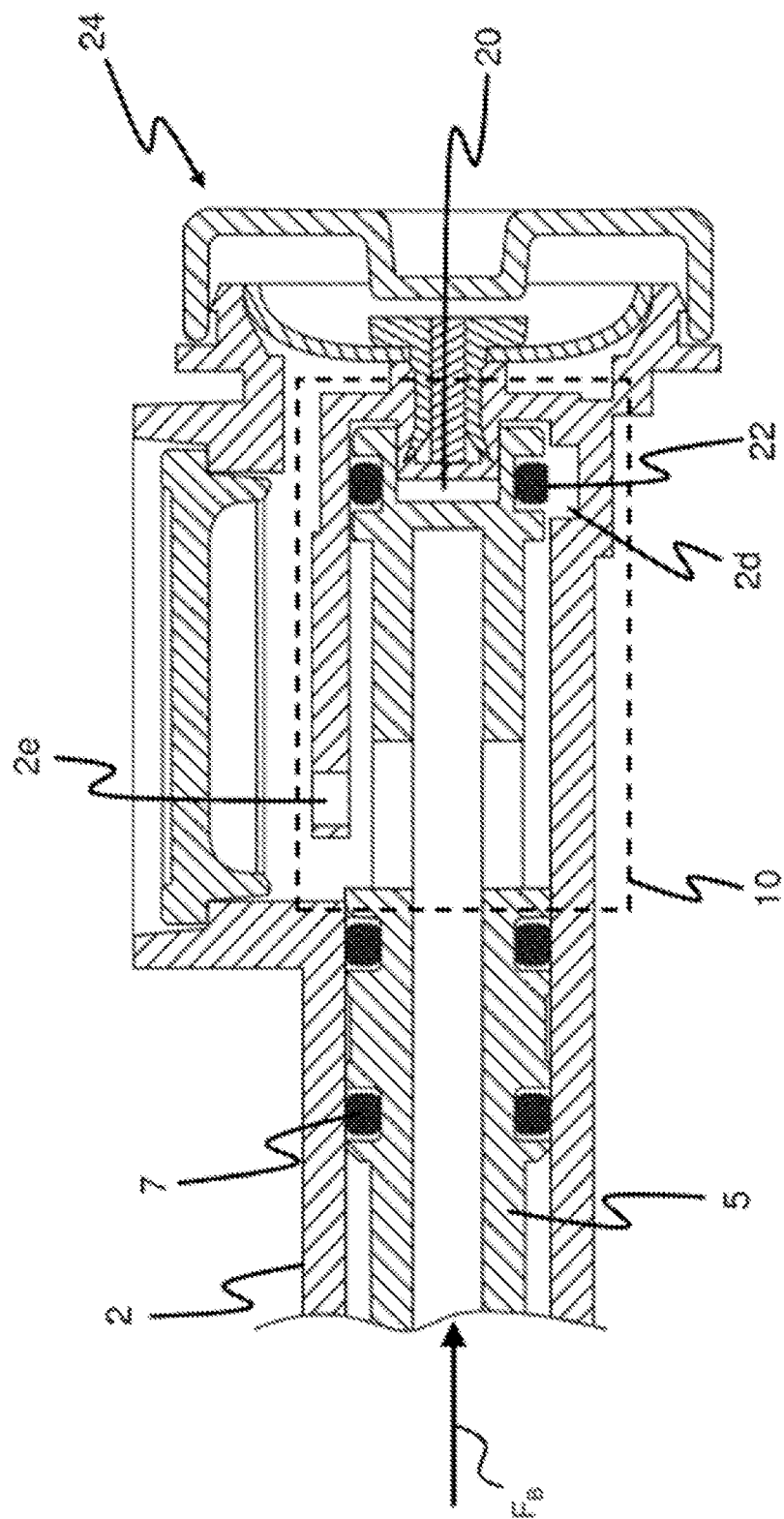
FIG. 6 shows a sectional view of the second embodiment of the invention, wherein the slide is in the "Drive" position.

This position is shown in FIG. 6. In this case, the chamber 20 has been compressed to a minimum volume but is in communication with the venting device 24 via equalization channel 2d since the seal 22 is not fully in contact with the housing 2 and thus does not seal the chamber 20.

To transfer the parking valve 1 to the "Park" position, the slide 5 must be moved back into the position depicted in FIG. 5. At the moment at which the seal 22 passes the left-hand edge of equalization channel 2d, the chamber 20 is closed again. The air enclosed therein is expanded by a further movement of the slide 5 in the same direction since the volume of the closed chamber 20 increases. As a result, a vacuum builds up under the slide 5 in the chamber 20, sucking the slide 5 to the right counter to the direction of movement and counteracting the movement as a counterforce $F_H$. Only when the seal 22 passes equalization channel 2e can the vacuum be balanced out again by means of equalization channel 2e since the chamber 20 is once again connected to the venting device 24. Thus, the counterforce on the slide 5 also disappears again.

When the slide 5 is in the position in which the seal 22 has passed over equalization channel 2e, the "Park" position of the slide 5 has been reached.

It should be noted that a counterforce is brought about in both end positions of the slide 5, as shown in FIGS. 5 and 6, by the production of an excess pressure or a vacuum during the movement of the slide 5, said counterforce pushing the slide 5 back into the initial position in the event of unintentional movement in one direction, provided that the seal 22 has not yet passed over the corresponding equalization channel 2d, 2e, which ensures pressure equalization. Thus, the slide 5 is retained in the end positions, or it has at least very limited mobility, which can however be configured in such a way that no indeterminate positions can be adopted. It is thus possible very largely to exclude even an unintentional actuation of the parking valve 1 and to achieve enhanced operational reliability. Moreover, a person skilled in the art can obtain a desired force characteristic of the counterforce on the slide 5 by configuration of the volume limits that the chamber 20 can assume and/or by appropriate design of the equalization channels 2d, 2e. It is furthermore conceivable to extend the equalization channels 2d, 2e along the direction of movement of the slide 5 in such a way that there are positions of the slide 5 in which neither an excess pressure nor a vacuum is built up in the chamber 20 since, in these positions, it is connected to the venting device 24.

The embodiments shown here represent preferred embodiments of the invention and thus do not have a restrictive effect on the subject matter of the invention. It is furthermore possible to conceive of further embodiments that can be formed by combining features of the embodiments described above. It is possible, for example, to form an inhibiting device which subjects the slide 5, in particular, to a magnetic force in one end position of the slide 5, and subjects the slide 5 to a force resulting from an excess pressure or a vacuum in the other end position. The "Park" and "Drive" positions are also chosen only by way of example, as described above. The "Drive" position may equally well be characterized by the extended position of the slide 5 and the "Park" position may equally well be characterized by the retracted position of the slide 5. It is furthermore not absolutely essential to make the two positions end positions of the slide 5. Moreover, the slide 5 can have further positions that an operator can select, wherein reliable transfer of the slide 5 to these positions can be achieved by means of the inhibiting device 10, alternatively or additionally by means of force application to the slide 5 as described above.

LIST OF REFERENCE SIGNS 1 parking valve
2 housing
2a port
2b port
2c vent port
2d equalization channel
2e equalization channel
3 spring-loaded brake cylinder
4 air reservoir
5 slide
5a slide knob
5b recess
6 seal
7 seal
8 air admission chamber
9 venting chamber
10 inhibiting device
12 partial path
13 path section
14 overall path
16 magnet
17 magnet
18 counterpart
20 chamber
20 seal
24 venting device
FB actuating force
FH counterforce
FU assisting force

What is claimed is:
1. A parking valve for manually actuating a spring-loaded parking brake, comprising:
 a housing with a port that is fluidically connectable to a release chamber of a spring-loaded brake cylinder, a port that is fluidically connectable to an air reservoir, and a vent port;
 a slide configured for manual actuation and being movable along an overall path between two end positions inside the housing, wherein the slide is configured to assume positions along the overall path in which, as a result of at least one seal, there is no fluidic connection between the port to the release chamber and the vent port, and to assume other positions along the overall path in which, as a result of the at least one seal, there is no fluidic connection between the port to the release chamber and the port to the air reservoir; and
 an inhibiting device, which, during movement at least along a partial path of the overall path, is configured to act on the slide in at least one direction with a continuously variable counterforce dependent on the position of the slide on the partial path,
 wherein the inhibiting device is configured to subject the slide, over a path section of the overall path which does not form part of the partial path, to an assisting force, dependent on the position of the slide on the path section, in the direction of the movement, or to no force, the inhibiting device is designed to exert the counterforce and/or the assisting force on the slide via magnetic force, the inhibiting device has two first magnets and a counterpart located between the two first magnets, which is designed to be attracted by the first magnets, and the counterpart is a second magnet or a magnetic element.

2. The parking valve as claimed in claim 1, wherein at least one of:

the partial path includes at least one end position of the slide, the counterforce is not produced on the basis of mechanical friction between two components, the inhibiting device has a latch, which is configured to hold the slide at least in one position or in a limited region of the overall path, and the at least one seal is provided on the slide or in the housing.

3. The parking valve as claimed in claim 1, wherein
the partial path comprises at least two sections of the overall path which do not adjoin one another directly.

4. The parking valve as claimed in claim 1, wherein
the counterforce on the slide has a maximum value which is increased by at least 25% relative to a force to which, owing to the design of the slide, said slide is subject during a movement.

5. The parking valve as claimed in claim 1, wherein
the counterforce on the slide has a maximum value which is increased by at least 50% relative to the force, which force is owing to the friction of the at least one seal in the housing.

6. The parking valve as claimed in claim 1, wherein
the assisting force is designed to bring about a movement of the slide into the end position which is in the direction of the movement, even without manual actuation.

7. The parking valve as claimed in claim 1, wherein
the inhibiting device is designed to ensure that the counterforce and/or the assisting force are/is formed from the minimum to the maximum value thereof over a path whose length is at least 2% of the overall path.

8. The parking valve as claimed in claim 1, wherein
the inhibiting device is designed to ensure that the counterforce and/or the assisting force are/is formed from the minimum to the maximum value thereof over a path whose length is at least 8% of the overall path.

9. The parking valve as claimed in claim 1, wherein at least one of:

the first magnets are provided on or in the slide and the counterpart is provided on or in the housing, or the first magnets are provided on or in the housing and the counterpart is provided on or in the slide, and the first magnets and the counterpart are arranged such that the force of attraction thereof becomes a maximum in one end position of the slide, at least relative to all other possible positions of the slide.

10. The parking valve as claimed in claim 1, wherein
the inhibiting device has a further first magnet or a further counterpart on or in the housing or on or in the slide.

11. A parking valve for manually actuating a spring-loaded parking brake, comprising:

a housing with a port that is fluidically connectable to a release chamber of a spring-loaded brake cylinder, a port that is fluidically connectable to an air reservoir, and a vent port;

a slide configured for manual actuation and being movable along an overall path between two end positions inside the housing, wherein the slide is configured to assume positions along the overall path in which, as a result of at least one seal, there is no fluidic connection between the port to the release chamber and the vent port, and to assume other positions along the overall path in which, as a result of the at least one seal, there is no fluidic connection between the port to the release chamber and the port to the air reservoir; and an inhibiting device, which, during movement at least along a partial path of the overall path, is configured to act on the slide in at least one direction with a continuously variable counterforce dependent on the position of the slide on the partial path, wherein the inhibiting device is configured to subject the slide, over a path section of the overall path which does not form part of the partial path, to an assisting force, dependent on the position of the slide on the path section, in the direction of the movement, or to no force, the inhibiting device has a chamber having an equalization channel, the chamber being fluidically closed by the slide and a part of the housing when the slide is moved over the partial path, and connected to the atmosphere or to a venting device via the equalization channel only when the slide is moved beyond the partial path, the chamber is designed to change volume in accordance with the movement of the slide, and the inhibiting device is designed to subject the slide to a counterforce which is formed by a vacuum and which increases in a first direction of movement since a volume of the chamber increases or which is formed by an excess pressure and which increases in a second direction of movement since air in the chamber is compressed giving rise in the chamber to the excess pressure.

12. The parking valve as claimed in claim 11, wherein
the closure of the chamber is accomplished by a seal of the slide and/or of the housing.

13. The parking valve as claimed in claim 12, wherein
the chamber is formed in the slide and/or the housing.

14. The parking valve as claimed in claim 11, wherein
the chamber is formed in the slide and/or the housing.

15. The parking valve as claimed in claim 11, wherein
the chamber is designed to be connected to atmosphere or to the venting device when the slide is moved beyond the partial path and/or the path section.

16. The parking valve as claimed in claim 11, wherein
the chamber is designed to be connected to an equalization chamber when the slide is moved beyond the partial path and/or the path section.

17. The parking valve as claimed in claim 11, wherein
the chamber undergoes a change in volume of at least 5% when the slide is moved over the partial path.

\* \* \* \* \*